(12) United States Patent
Lam et al.

(10) Patent No.: US 10,578,876 B1
(45) Date of Patent: Mar. 3, 2020

(54) WAVEGUIDE HAVING A PHASE-MATCHING REGION

(71) Applicant: Facebook Technologies, LLC, Menlo Park, CA (US)

(72) Inventors: Wai Sze Tiffany Lam, Redmond, WA (US); Ningfeng Huang, Redmond, WA (US); Alexander Koshelev, Redmond, WA (US); Hee Yoon Lee, Bellevue, WA (US); Austin Lane, Bellevue, WA (US); Giuseppe Calafiore, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/126,968

(22) Filed: Sep. 10, 2018

(51) Int. Cl.
| | |
|---|---|
| *G02B 27/01* | (2006.01) |
| *G02B 27/44* | (2006.01) |
| *G02B 27/42* | (2006.01) |
| *G02F 1/35* | (2006.01) |
| *G02B 27/00* | (2006.01) |

(52) U.S. Cl.
CPC ..... *G02B 27/0172* (2013.01); *G02B 27/0093* (2013.01); *G02B 27/4205* (2013.01); *G02B 27/44* (2013.01); *G02F 1/3544* (2013.01); *G02B 2027/0178* (2013.01)

(58) Field of Classification Search
CPC ............ G02B 27/0172; G02B 27/4205; G02B 27/0093; G02B 27/44; G02B 2027/0178; G02F 1/3544
See application file for complete search history.

(56) References Cited

U.S. PATENT DOCUMENTS 9,513,480 B2 * 12/2016 Saarikko .............. G02B 5/1861

* cited by examiner

*Primary Examiner* — Ryan A Lepisto
(74) *Attorney, Agent, or Firm* — Matthew A. Pequignot; Evan J. Newman

(57) ABSTRACT

A waveguide is provided including first and second diffraction gratings and a phase-matching region conterminous with the first and second diffraction gratings and disposed in an optical path between the gratings. For an optical beam propagating along the optical path, the first grating adds a first phase shift to the optical beam reflecting from the first grating, the second grating adds a second phase shift to the optical beam reflecting from the second grating, and the phase-matching region adds a matching phase shift to the optical beam reflecting from the phase-matching region. The matching phase shift is between minimum and maximum values of the first and second phase shifts.

26 Claims, 21 Drawing Sheets

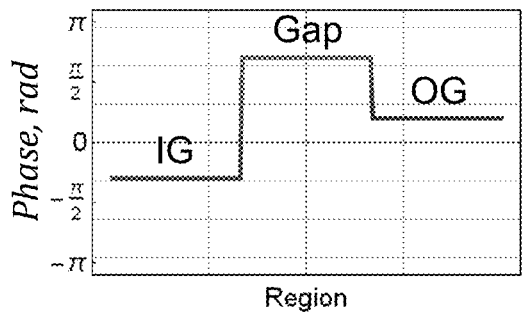
FIG. 3A
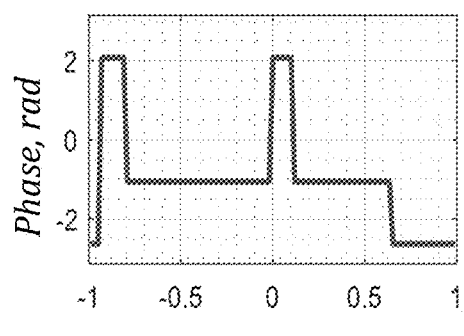
FIG. 3B
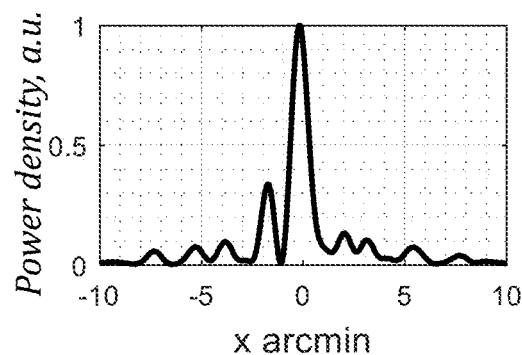
FIG. 3C
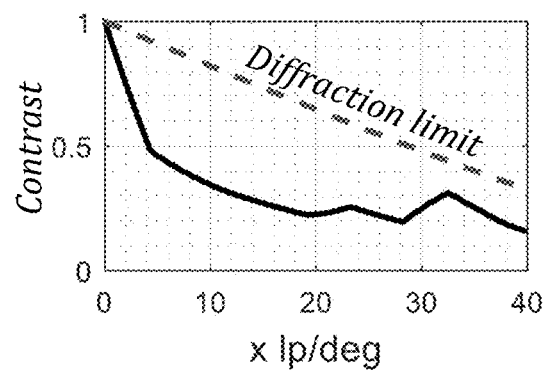
FIG. 3D
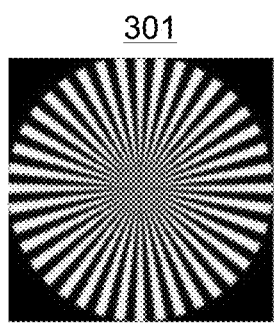 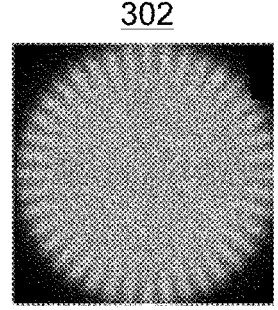
FIG. 3E

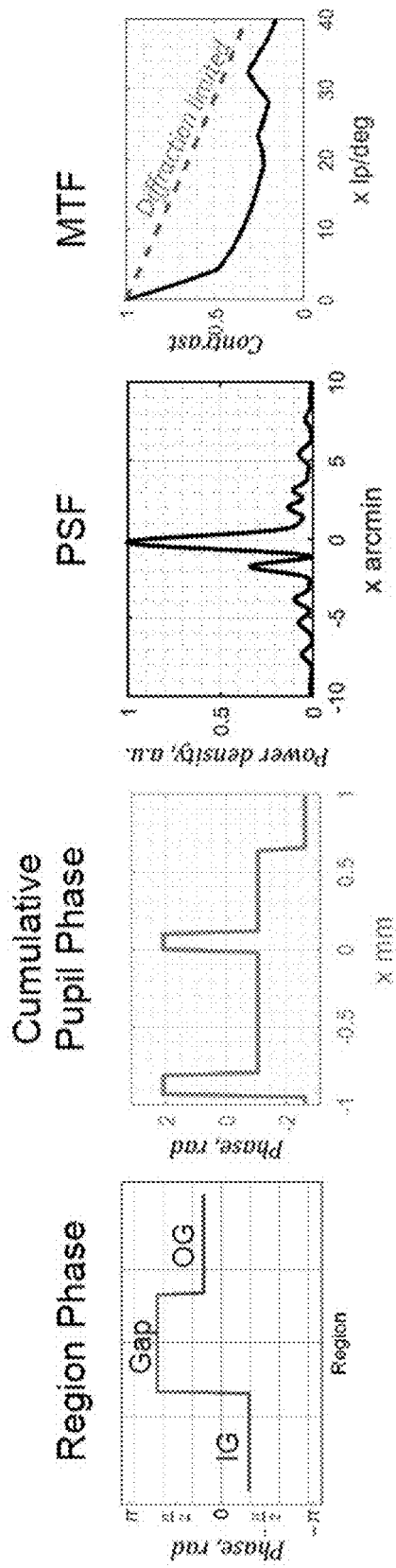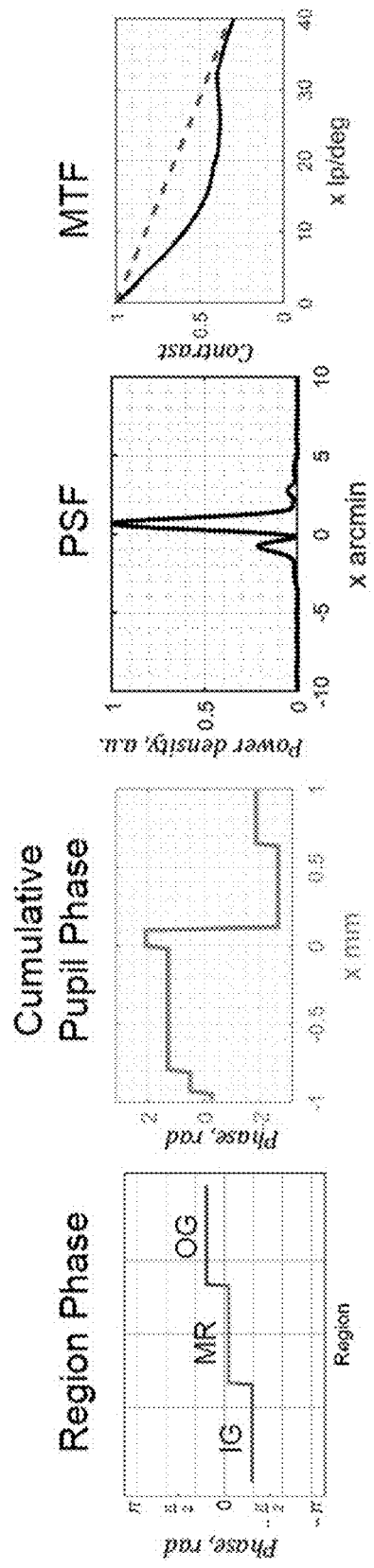

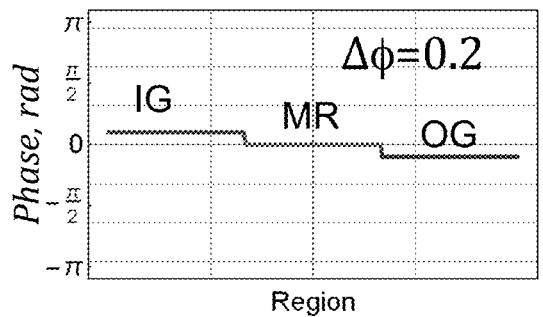
*FIG. 10A*
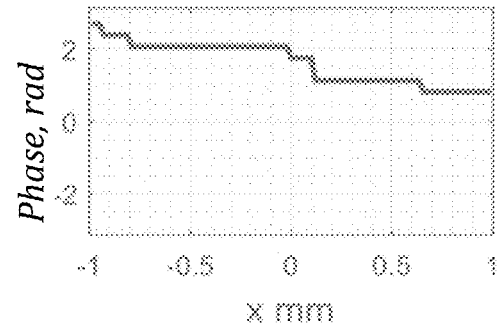
*FIG. 10B*
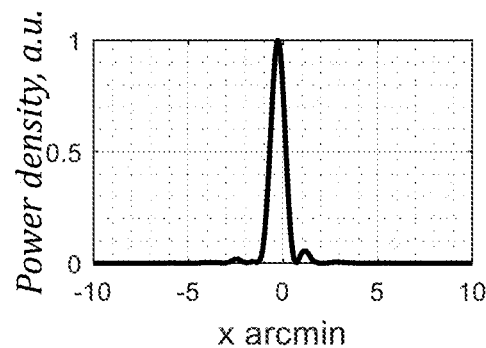
*FIG. 10C*
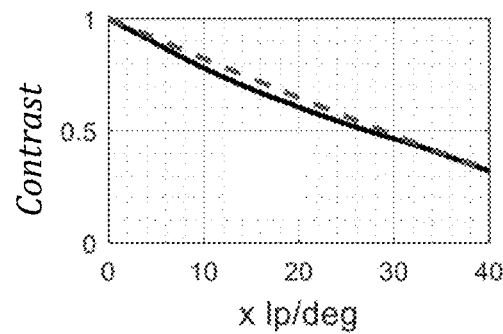
*FIG. 10D*
1001   1002
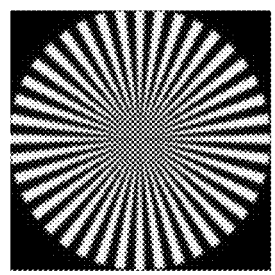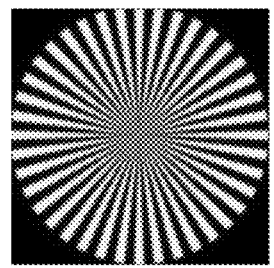
*FIG. 10E*

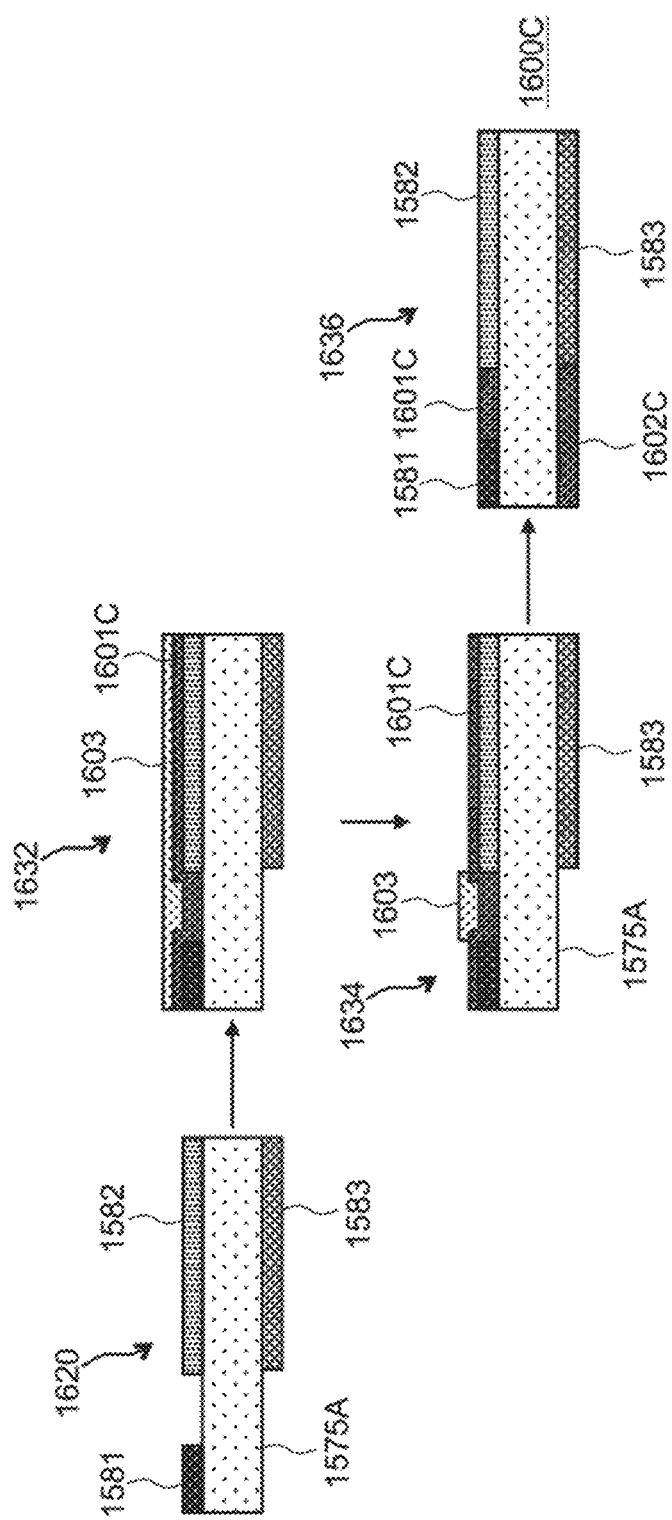

WAVEGUIDE HAVING A PHASE-MATCHING REGION

TECHNICAL FIELD

The present disclosure relates to optical components and modules, and in particular to optical waveguides and waveguide modules usable in display systems.

BACKGROUND

Head-mounted displays (HMDs), near-eye displays, and other forms of wearable display systems can be used to provide virtual scenery to a user, or to augment a real scenery with additional information or virtual objects. The virtual or augmented scenery can be three-dimensional (3D) to enhance the experience and to match virtual objects to the real 3D scenery observed by the user. In some display systems, a head and/or eye position and orientation of the user are tracked, and the displayed scenery is dynamically adjusted depending on the user's head orientation and gaze direction, to provide experience of immersion into a simulated or augmented 3D environment.

It is desirable to reduce size and weight of a wearable display. Lightweight and compact near-eye displays reduce the strain on user's head and neck, and are generally more comfortable to wear. Typically, an optics block is one of the heaviest modules of the display. Compact planar optical components, such as waveguides, gratings, Fresnel lenses, etc., can be used to reduce size and weight of an optics block. However, compact planar optics may be prone to optical distortions and aberrations.

BRIEF DESCRIPTION OF THE DRAWINGS

Exemplary embodiments will now be described in conjunction with the drawings, in which:

FIG. 3A is an optical phase map of a waveguide having a gap between diffraction gratings;

FIG. 3B is a beam phase profile of an output optical beam of the waveguide of FIG. 3A;

FIG. 3C is a point spread function (PSF) of the waveguide of FIG. 3A;

FIG. 3D is a modulation transfer function (MTF) of the waveguide of FIG. 3A;

FIG. 3E is a graphical representation of a test image before and after the waveguide having the optical phase map of FIG. 3A;

FIG. 6A is an optical phase map of a waveguide having a total internal reflection (TIR) gap between in-coupling and out-coupling diffraction gratings;

FIG. 6B is a beam phase profile of an output optical beam of the waveguide of FIG. 6A;

FIG. 6C is a PSF the waveguide of FIG. 6A;

FIG. 6D is an MTF of the waveguide of FIG. 6A;

FIG. 7A is an optical phase map of a waveguide having phase-matching region between in-coupling and out-coupling diffraction gratings, the phase-matching region comprising an intermediate up-step;

FIG. 7B is a beam phase profile of an output optical beam of the waveguide of FIG. 7A;

FIG. 7C is a PSF the waveguide of FIG. 7A;

FIG. 7D is an MTF of the waveguide of FIG. 7A;

FIG. 10A is an optical phase map of a waveguide having phase-matching region between in-coupling and out-coupling diffraction gratings having a phase mismatch of $0.2\pi$, the phase-matching region comprising an intermediate down-step;

FIG. 10B is a beam phase profile of an output optical beam of the waveguide of FIG. 10A;

FIG. 10C is a PSF the waveguide of FIG. 10A;

FIG. 10D is an MTF of the waveguide of FIG. 10A;

FIG. 10E is a graphical representation of a test image before and after the waveguide of FIG. 10A;

FIG. 16C illustrates side cross-sectional views of a waveguide at different stages of manufacture employing a photoresist etching process;

DETAILED DESCRIPTION

Figure 1:
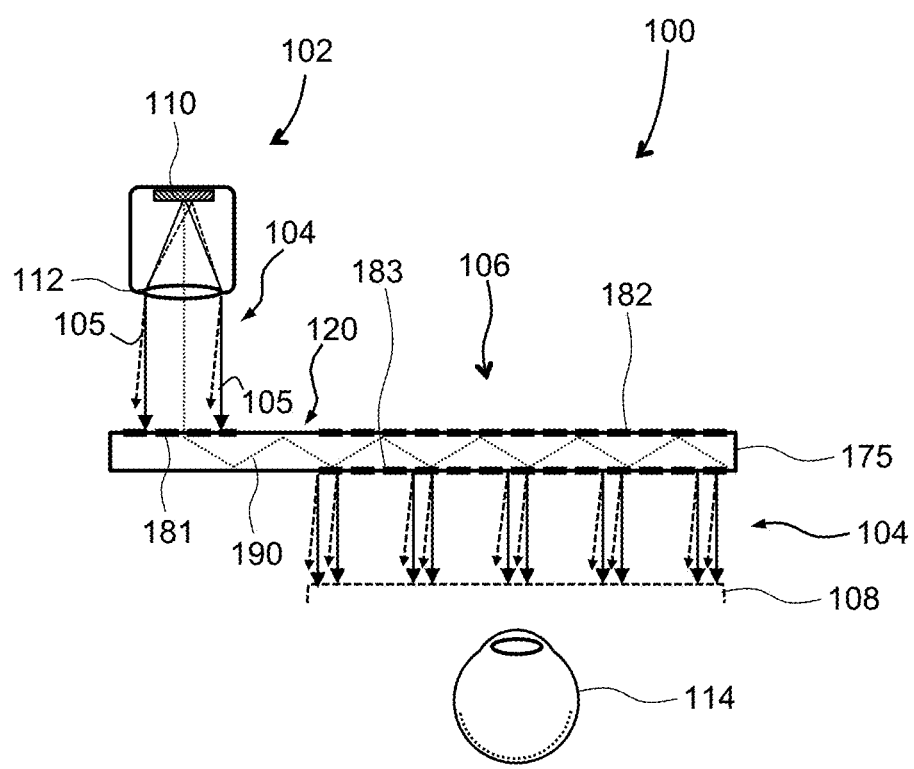
FIG. 1 is a side cross-sectional view of an optics block for a near-eye display.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

An imaging waveguide of a near-eye optical display carries a beam of image light from a projector to an eye of a user. The beam of image light propagates in the waveguide via multiple reflections from inner waveguide surfaces and diffraction on grating structures of the waveguide. Each reflection has a phase shift associated with that reflection. When the beam of image light impinges on a boundary between a grating structure and a reflective surface, two different phase shifts may be imparted on different lateral portions of the beam's wavefront. When several boundaries between different reflectors and gratings have been in the optical path of the propagating beam of image light, the phase profile of the beam may accumulate several interposed phase steps due to reflection or diffraction at the boundaries. These multiple steps of phase can cause a drop of modulation transfer function of the waveguide, losing the contrast and causing blurriness of the image carried by the beam.

In accordance with the present disclosure, at least one phase matching region may be provided in areas of the waveguide surface located between different reflectors, gratings, etc. These phase matching regions may reduce the above deleterious effects of boundary reflections.

In accordance with the present disclosure, there is provided a waveguide comprising first and second diffraction gratings and a first phase-matching region conterminous with the first and second diffraction gratings and disposed in an optical path therebetween. For an optical beam propagating along the optical path, the first diffraction grating adds a first phase shift $\phi_1$ to the optical beam reflecting therefrom. The second diffraction grating adds a second phase shift $\phi_2$ to the optical beam reflecting therefrom. The first phase-matching region adds a first matching phase shift $\phi_{M1}$ to the optical beam reflecting therefrom, such that $\min(\phi_1, \phi_2) \leq \phi_{M1} \leq \max(\phi_1, \phi_2)$.

In some embodiments, the first phase-matching region is distinct from the first and second diffraction gratings. For example, the first phase-matching region may include a dielectric coating, a polymer layer, a metamaterial, a sub-wavelength grating, etc. In some embodiments, he phase difference $|\phi_1-\phi_2|$ is no greater than $0.6\pi$. The first matching phase shift $\phi_{M1}$ may monotonically vary from $\phi_1$ to $\phi_2$ in going from the first diffraction grating to the second diffraction grating. For example, the first phase-matching region may include a subwavelength grating with monotonically varying grating period in going from the first diffraction grating to the second diffraction grating. In some embodiments, the first phase-matching region comprises one of the first and second diffraction gratings, whereby the first and second diffraction gratings are conterminous.

The waveguide may include a slab of transparent material, the slab supporting the first and second diffraction gratings at a first side of the slab. The slab may include the optical path and may support the first phase-matching region at the first side of the slab. The first phase-matching region may include an area of a reduced thickness of the slab. The slab may include a dielectric coating supporting the first and second diffraction gratings, and the first phase-matching region may be void of the dielectric coating.

In some embodiments, a third diffraction grating may be provided. The third diffraction grating may be supported by the slab at a second opposed side of the slab and disposed opposite the second diffraction grating. The optical path may extend between the first and third diffraction gratings and includes the second diffraction grating. A second phase-matching region conterminous with the third diffraction grating may be disposed in the optical path; for the optical beam propagating along the optical path, the third diffraction grating adds a third phase shift $\phi_3$ to the optical beam reflecting therefrom, and the second phase-matching region adds a second matching phase shift $\phi_{M2}$ to the optical beam reflecting therefrom, such that $|\phi_3-\phi_{M2}|<|\phi_3-\phi_{TIR}|$, where $\phi_{TIR}$ is a phase shift added to the optical beam upon total internal reflection (TIR) of the optical beam from inside the slab.

In accordance with the present disclosure, there is further provided an optical module comprising the waveguide described above and an image projector optically coupled to the waveguide for providing the optical beam. The optical beam may include at least one color channel. The condition $\min(\phi_1, \phi_2) \leq \phi_M \leq \max(\phi_1, \phi_2)$ may be fulfilled for each color channel present.

In accordance with the present disclosure, there is further provided a method for improving a modulation transfer function of a waveguide comprising first and second diffraction gratings. The method may include providing a first phase-matching region between the first and second diffraction gratings. For an optical beam propagating along the optical path between the first and second diffraction gratings, the first diffraction grating adds a first phase shift $\phi_1$ to the optical beam reflecting therefrom; the second diffraction grating adds a second phase shift $\phi_2$ to the optical beam reflecting therefrom; and the first phase-matching region adds a first matching phase shift $\phi_{M1}$ to the optical beam reflecting therefrom, such that $\min(\phi_1, \phi_2) \leq \phi_{M1} \leq \max(\phi_1, \phi_2)$. In embodiments where the first and second diffraction gratings and the first phase-matching region are supported by a slab of transparent material supporting a third diffraction grating at a second opposed side of the slab and disposed opposite the second diffraction grating, the optical path may extend between the first and third diffraction gratings and may include the second diffraction grating. For such embodiments, the method may further include providing a second phase-matching region conterminous with the third diffraction grating and disposed in the optical path. For the optical beam propagating along the optical path, the third diffraction grating adds a third phase shift $\phi_3$ to the optical beam reflecting therefrom; and the second phase-matching region adds a second matching phase shift $\phi_{M2}$ to the optical beam reflecting therefrom, such that $|\phi_3 - \phi_{M2}| < |\phi_3 - \phi_{TIR}|$, where $\phi_{TIR}$ is a phase shift added to the optical beam upon total internal reflection (TIR) of the optical beam from inside the slab.

Referring now to FIG. 1, an optics block, or an optical module 100 of a near-eye display includes an image projector 102 optically coupled to a waveguide 106. The image projector 102 may include a microdisplay 110 optically coupled to a collimator 112 for collimating, or nearly collimating, light emitted by each pixel of the microdisplay 110, such that an optical beam 104 emitted by the image projector 102 carries an image displayed by the microdisplay 110 in angular domain. Herein, the term "image in angular domain" means that each ray angle of rays 105 of the optical beam 104 corresponds to a pixel coordinate of the image displayed by the microdisplay 110.

The waveguide 106 includes a slab 175 of transparent material, e.g. glass, supporting first 181 and second 182 diffraction gratings at a first side of the slab 175, i.e. the upper side in FIG. 1. A gap 120 may be provided between the first 181 and second 182 diffraction gratings. The waveguide 106 may further include a third diffraction grating 183 supported by the slab 175 at a second, opposed side of the slab 175 and disposed opposite the second diffraction grating 182. In operation, the optical beam 104 emitted by the image projector 102 propagates in the slab 175 via total internal reflections (TIR) from inside the slab. The optical beam 104 propagates in a zigzag optical path 190 extending between the first 181 and third 183 diffraction gratings and including the second diffraction grating 182. The optical beam 104 exits at the third diffraction grating 183 and propagates towards a user's eye 114 disposed at an eyebox 108.

Figure 2A:
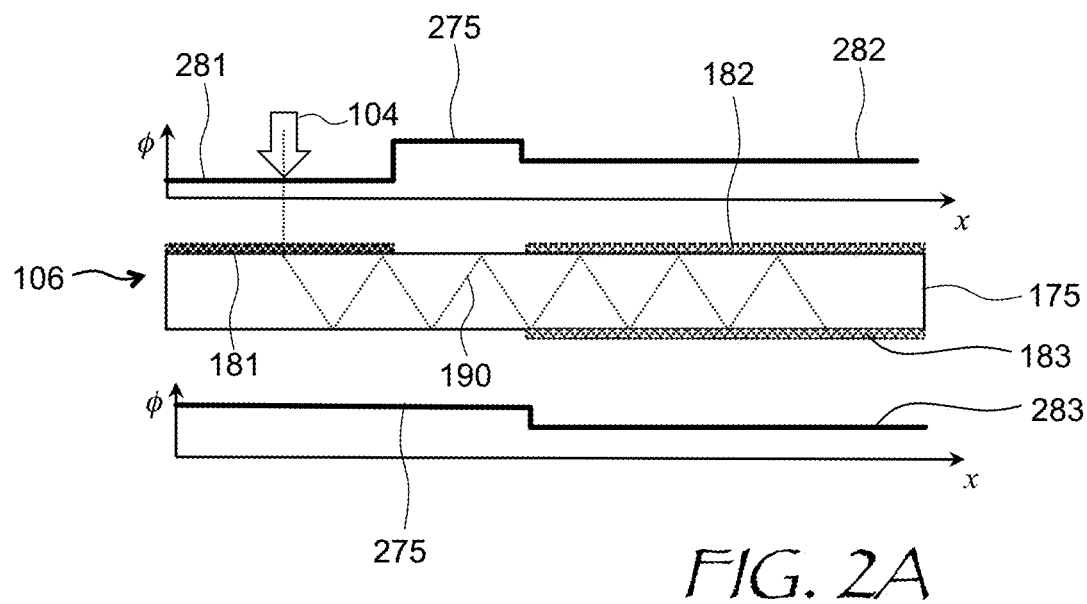
FIG. 2A is a side cross-sectional view and an optical phase map of a waveguide usable in the optics block of FIG. 1.

Referring to FIG. 2A, each optical surface of the waveguide 106 has an associated phase shift imparted on the optical beam 104 propagating in the waveguide 106 along the optical path 190 and impinging on that surface. For example, the first diffraction grating 181 has an associated phase shift 281, the second diffraction grating 182 has an associated phase shift 282, and the third diffraction grating 183 has an associated phase shift 283. A TIR in the slab 175 also has an associated TIR phase shift 275.

Figure 2B:
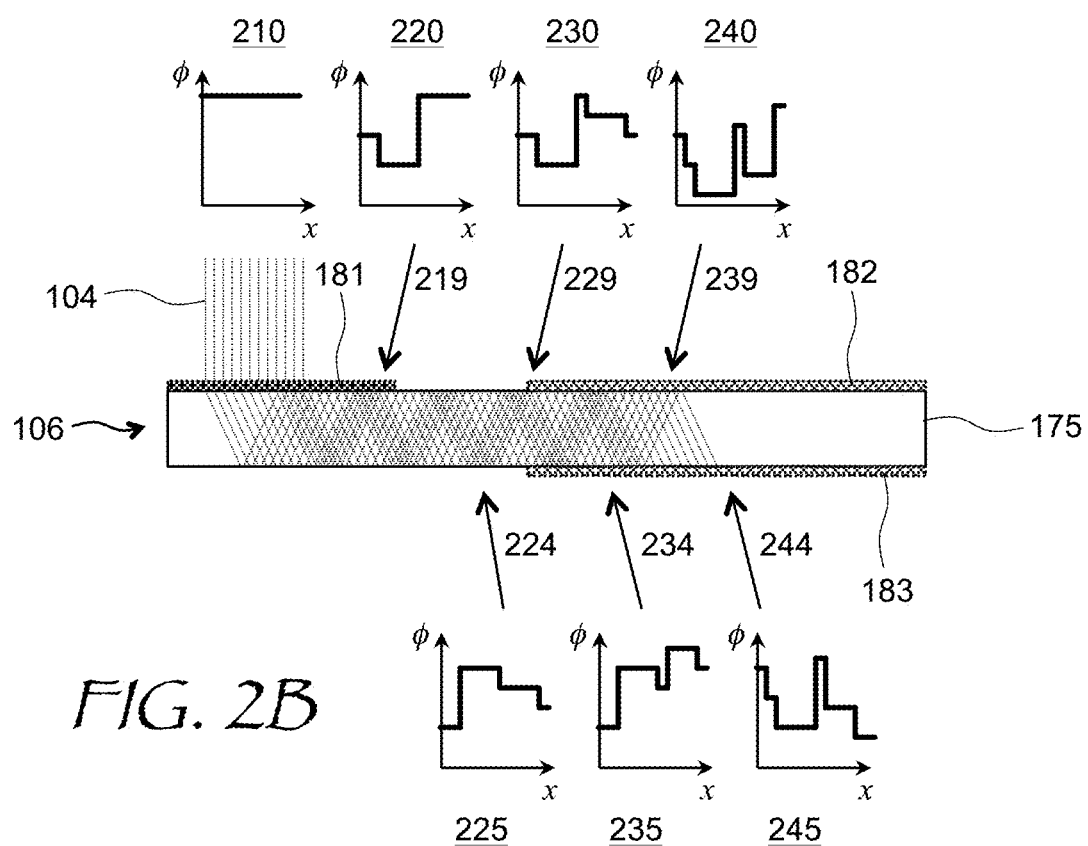
FIG. 2B is a side cross-sectional view of the waveguide of FIG. 2A illustrating the accumulation of phase error of an optical beam propagating in the waveguide of FIG. 2A.
Figure 4A:
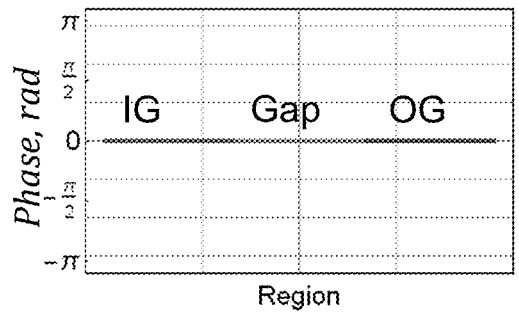
FIG. 4A is an optical phase map of an ideal waveguide.
Figure 4B:
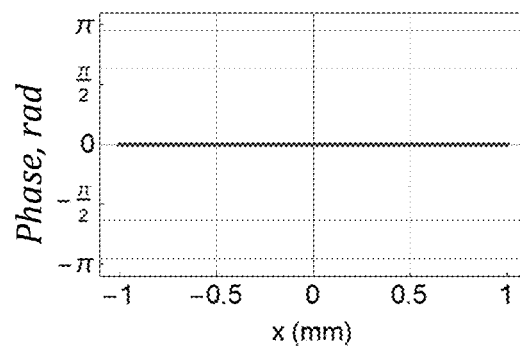
FIG. 4B is a beam phase profile of an output optical beam of the ideal waveguide of FIG. 4A.
Figure 4C:
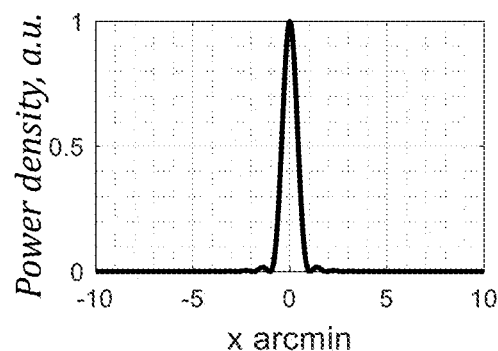
FIG. 4C is a PSF of the ideal waveguide of FIG. 4A.
Figure 4D:
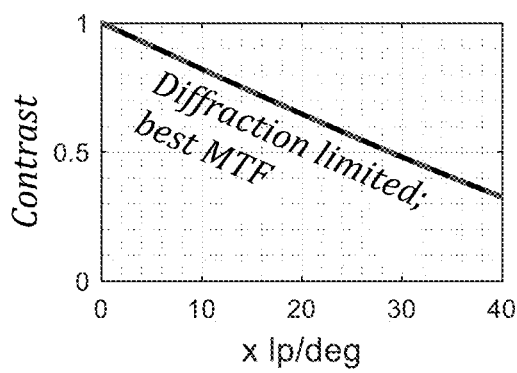
FIG. 4D is an MTF of the ideal waveguide of FIG. 4A.
Figure 4E:
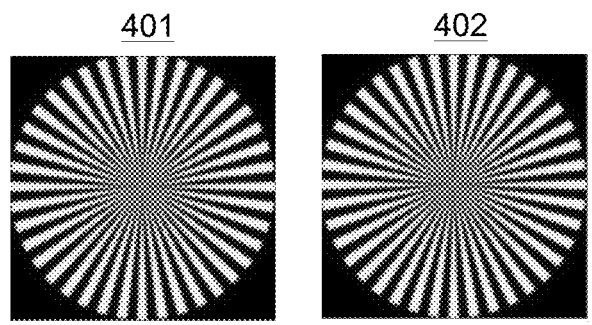
FIG. 4E is a graphical representation of a test image before and after the ideal waveguide of FIG. 4A.

The effect that the different phase shifts 281, 282, 283, and 275 have on the optical beam 104 is illustrated in FIG. 2B. Initially, the optical beam 104 has a plane wavefront represented by a flat phase profile 210. When the optical beam 104 impinges at a location 219, one portion of the beam 104 will reflect from the first diffraction grating 181, and another portion of the beam 104 will undergo a TIR from the waveguide 175, resulting in a phase profile 220 having a step. After a couple of reflections, the optical beam 104 reaches a next location 224 at an edge of the third diffraction grating 183, resulting in a phase profile 225 having multiple steps. Then, the optical beam 104 impinges at a next location 229 resulting in even more complicated phase profile 230. From then on, the optical beam 104 impinges at next locations 234, 239, and 244, acquiring multiple-step phase profiles 235, 240, and 245 respectively. The final phase phase profile 245 is quite complicated in that it includes many phase steps, or phase jumps.

The deleterious effect of the accumulated phase steps or phase jumps on image quality is illustrated in FIGS. 3A to 3E. FIG. 3A shows a phase map of a waveguide similar to the waveguide 104 of FIG. 1. The phase map includes an area of in-coupling grating (IG), a gap between the gratings (Gap), and an area of an out-coupling grating (OG). FIG. 3B illustrates an example output phase profile, or optical phase map, of a beam propagated through the waveguide of FIG. 3A. The phase jumps cause multiple secondary peaks in a point spread function (PSF) of FIG. 3C. Furthermore, a modulation transfer function (MTF; FIG. 3D) shows a significant drop in contrast for a broad range of spatial frequencies ranging from 5 line pair per degree and 32 line pair per degree, resulting in blurring of a target image 301 (FIG. 3E). A blurred image 302 lacks most fine details of the target image 301.

Referring to FIGS. 4A to 4E, performance of an "ideal" waveguide having the phases of different regions IG, Gap, and OG perfectly matched (FIG. 4A) is illustrated for comparison purposes. The phase profile (FIG. 4B) of the "ideal" waveguide is perfectly uniform, and the PSF (FIG. 4C) shows a single diffraction peak corresponding to an Airy disk and peripheral Airy ring pattern, for a circular beam. The MTF (FIG. 4D) is a diffraction-limited MTF; accordingly, a resulting image 402 is almost identical to a target image 401, being only limited by diffraction.

Figure 5:
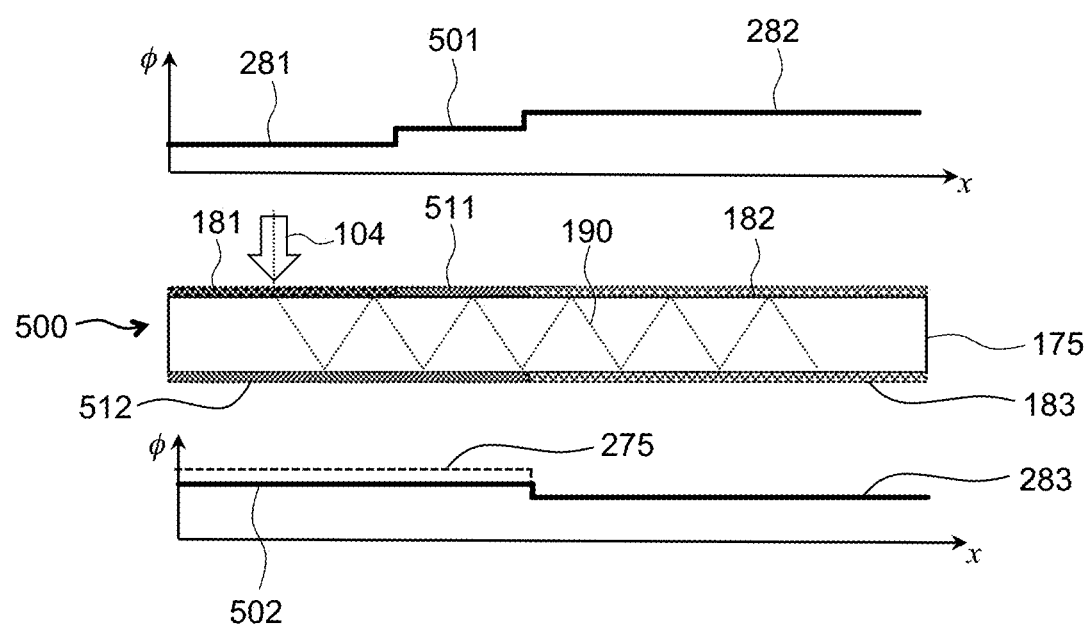
FIG. 5 is a side cross-sectional view and an optical phase map of a waveguide having a phase-matching region comprising an intermediate up-step.

While a perfect matching of phase profiles of reflectors and diffraction gratings of a waveguide may not always be possible, phase-matching regions may be configured to at least reduce the deleterious effects of phase jumps. Turning to FIG. 5, a waveguide 500 includes a first phase-matching region 511 conterminous with the first 181 and second 182 diffraction gratings and disposed in the optical path 190 between the first 181 and second 182 diffraction gratings. A second phase-matching region 512 may be provided adjacent the optional third diffraction grating 183 supported by the slab 175 at the second opposed side of the slab 175 and disposed opposite the second diffraction grating 182. Phase shifts imposed onto the optical beam 104 propagating along the optical path 190 are graphically represented by phase maps above and below the waveguide 500. The top phase map shows the first phase shift 281 added to the optical beam 104 by the first diffraction grating 181, the second phase shift 282 added to the optical beam 104 by the second diffraction grating 182, and a first matching phase shift 501 added to the optical beam 104 by the phase-matching region 511. The bottom phase map shows a second matching phase shift 502 added to the optical beam 104 by the second phase-matching region 512, and the third phase shift 283 added to the optical beam 104 by the third diffraction grating 183. The second matching phase shift 502 is shown with reference to the TIR phase shift 275 (dashed line).

The first phase shift 281, the second phase shift 282, and the first matching phase shift 501 fulfill a condition $$\min(\phi_1,\phi_2) \leq \phi_{M1} \leq \max(\phi_1,\phi_2) \quad (1)$$

where $\phi_1$ denotes the first phase shift 281, $\phi_2$ denotes the second phase shift 282, and $\phi_{M1}$ denotes the first matching phase shift 501. The third phase shift 283 and the second matching phase shift 502 may satisfy a condition $$|\phi_3 - \phi_{M2}| < |\phi_3 - \phi_{TIR}| \quad (2)$$

where $\phi_3$ denotes the third phase shift 283, $\phi_{M2}$ denotes the second matching phase shift 502, and $\phi_{TIR}$ denotes the TIR phase shift 275.

The improvement achieved by using the first phase-matching region 501 is illustrated in FIGS. 7A to 7D, which are disposed under FIGS. 6A to 6D corresponding to a waveguide with a TIR region in place of the phase-matching region 501. FIGS. 6A and 7A show the phase maps for the two cases. In FIG. 7A, the magnitude of the phase of the matching region (MR) 501 is between the phase magnitudes of the in-coupling first diffraction grating 181 (IG) and the out-coupling second diffraction grating 182 (OG). In FIG. 6A, the phase magnitude of TIR in the gap is higher than that the phase magnitudes of the in-coupling diffraction grating 181 and the out-coupling diffraction grating 182. The corresponding cumulative pupil phase distributions are shown in FIGS. 7B and 6B. One can see that there is a larger number of rapid phase jumps in FIG. 6B than in FIG. 7B. The corresponding PSFs are shown in FIGS. 7C and 6C; it is seen that, with the different phase variations, the PSF of FIG. 7C shows less rippling than the PSF of FIG. 6C. As a result, the waveguide with the phase-matching region 501 has a better MTF (FIG. 7D) in comparison with the MTF of the waveguide without a phase-matching region (FIG. 6D).

Figure 8A:
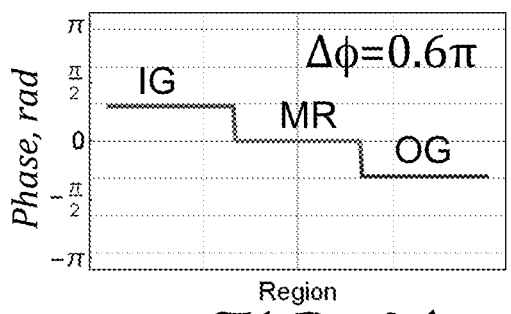
FIG. 8A is an optical phase map of a waveguide having phase-matching region between in-coupling and out-coupling diffraction gratings having a phase mismatch of $0.6\pi$, the phase-matching region comprising an intermediate down-step.
Figure 8B:
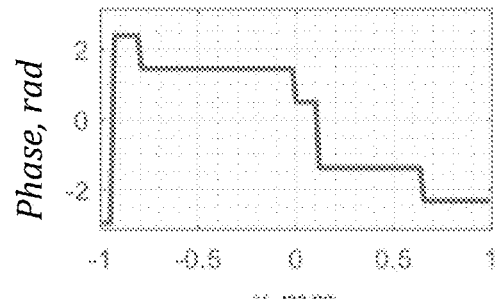
FIG. 8B is a beam phase profile of an output optical beam of the waveguide of FIG. 8A.
Figure 8C:
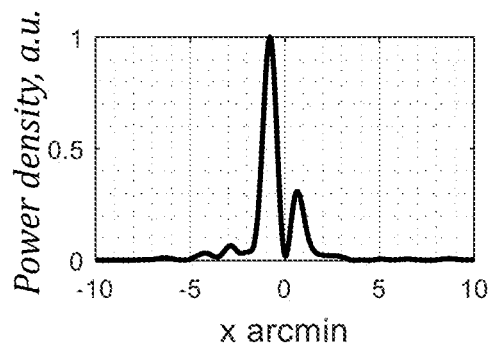
FIG. 8C is a PSF the waveguide of FIG. 8A.
Figure 8D:
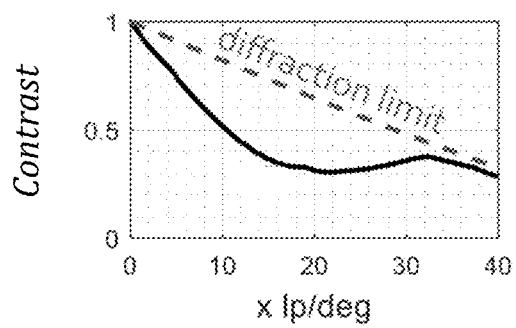
FIG. 8D is an MTF of the waveguide of FIG. 8A.
Figure 8E:
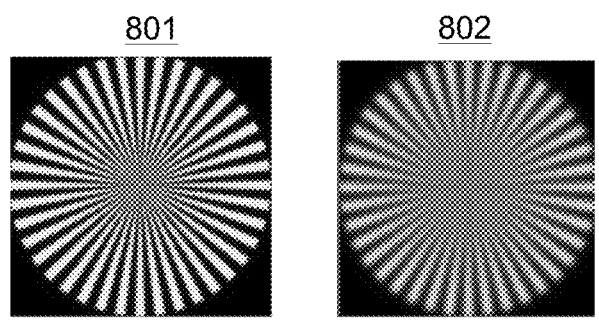
FIG. 8E is a graphical representation of a test image before and after the waveguide of FIG. 8A.
Figure 9A:
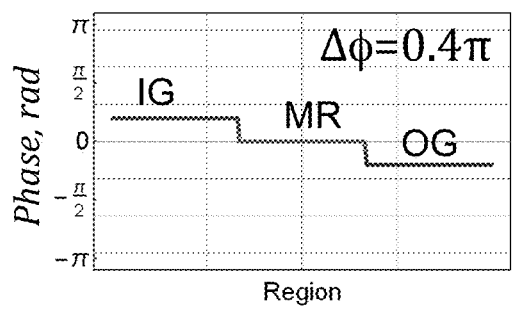
FIG. 9A is an optical phase map of a waveguide having phase-matching region between in-coupling and out-coupling diffraction gratings having a phase mismatch of $0.4\pi$, the phase-matching region comprising an intermediate down-step.
Figure 9B:
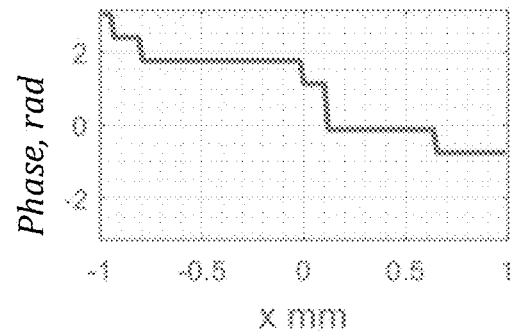
FIG. 9B is a beam phase profile of an output optical beam of the waveguide of FIG. 9A.
Figure 9C:
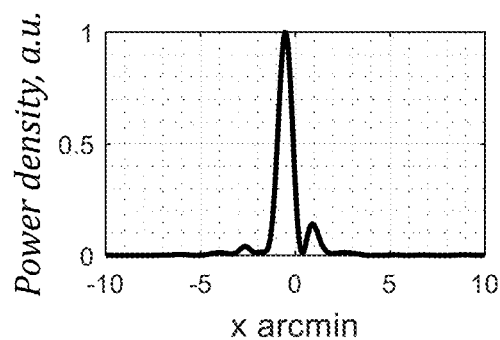
FIG. 9C is a PSF the waveguide of FIG. 9A.
Figure 9D:
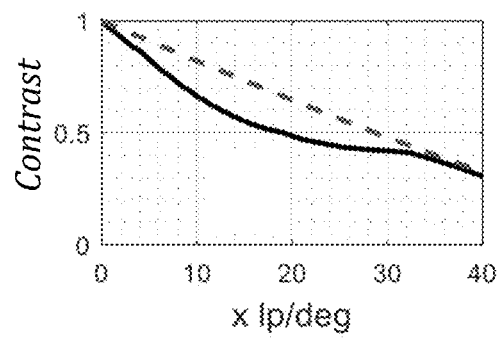
FIG. 9D is an MTF of the waveguide of FIG. 9A.

Simulations were also run for the phase-matching region 501 having an intermediate down-step from the phase of the in-coupling diffraction grating 181 to the phase of the out-coupling diffraction grating 182. FIGS. 8A to 8E, FIGS. 9A to 9E, and FIGS. 10A to 10E illustrate optical performance of a waveguide with the total phase variation $\Delta\phi = |\phi_1 - \phi_2|$ of $0.6\pi$ (FIGS. 8A to 8E), $0.4\pi$ (FIGS. 9A to 9E), and $0.2\pi$ (FIGS. 10A to 10E). FIGS. 8A, 9A, and 10A show the phase maps. FIGS. 8B, 9B, and 10B show the corresponding cumulative pupil phases. FIGS. 8C, 9C, and 10C show the corresponding PSFs. FIGS. 8D, 9D, and 10D show the corresponding MTFs. Finally, FIGS. 8E and 10E show, side-by-side, a target image (801 and 1001 respectively) and a resulting image (802 and 1002 respectively). From comparison of FIGS. 8A to 8E, FIGS. 9A to 9E, and FIGS. 10A to 10E, one can conclude that the reduction of $\Delta\phi$ beyond a certain threshold can result in a significant improvement of the image quality and associated characteristics such as MTF and PSF. As a guideline, one can obtain a modest improvement in a waveguide at the value of $\Delta\phi \leq 0.6\pi$. At $\Delta\phi \leq 0.4\pi$, the improvement is more pronounced; and at $\Delta\phi \leq 0.2\pi$, the image degradation becomes negligible.

Figure 11:
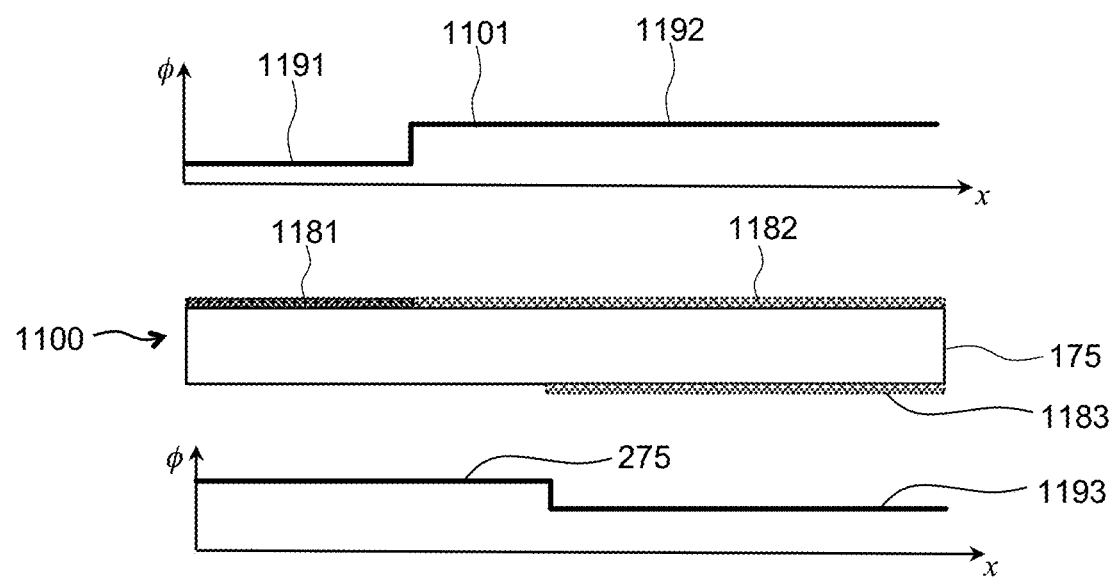
FIG. 11 is a side cross-sectional view and an optical phase map of a waveguide having a phase-matching region matched to an out-coupling grating.

Referring now to FIG. 11, a waveguide 1100 includes first 1181 and second 1182 diffraction gratings on top of the slab 175, and a third diffraction grating 1183 on the bottom of the slab 175. In this embodiment, a phase-matching region 1101 can be a portion of the second diffraction grating 1182 i.e. first 1181 and second 1182 diffraction gratings can be conterminous, or the TIR of the gap region can be made to produce the same phase profile as the second diffraction grating 1182. The corresponding phase profiles are shown above and below the waveguide 1100. The top phase profile includes a first phase 1191 of the first diffraction grating 1181 and a second phase 1192 of the second diffraction grating 1182, with a single step between them. The bottom phase profile includes the TIR phase 275 and a third phase 1193 of the third diffraction grating 1183.

Figures 12A, 12B, 12C, 12D:
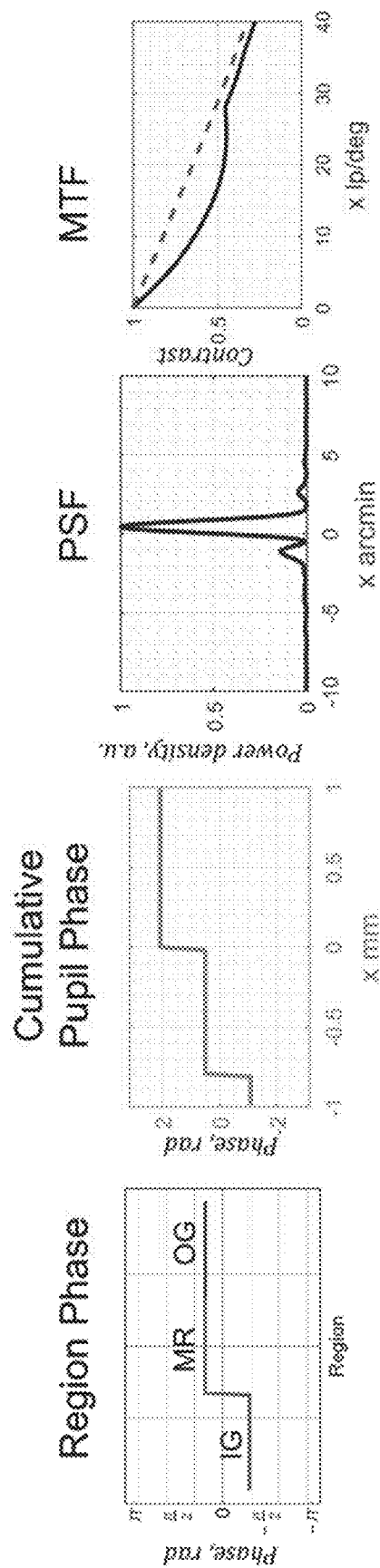
FIG. 12A is an optical phase map of a waveguide having the phase-matching region of FIG. 11.
FIG. 12B is a beam phase profile of an output optical beam of the waveguide of FIG. 12A.
FIG. 12C is a PSF the waveguide of FIG. 12A.
FIG. 12D is an MTF of the waveguide of FIG. 12A.

FIGS. 12A to 12D illustrate the optical performance of the waveguide 1100. Similarly to FIGS. 6A to 6D and FIGS. 7A to 7D, FIG. 12A shows the optical phase map, FIG. 12B shows the cumulative phase profile, FIG. 12C shows the PSF, and FIG. 12D shows the MTF. By comparing these figures with FIGS. 6A to 6D, one can see that a considerable improvement of optical performance is obtained. It is further noted that the phase-matching region 1101 may have the phase matched to that of the in-coupling diffraction grating 1181, with similar results. In all waveguides considered thus far, the phase-matching region may include a dielectric coating, a polymer layer, a metamaterial, a sub-wavelength grating, etc.

Figure 13A:
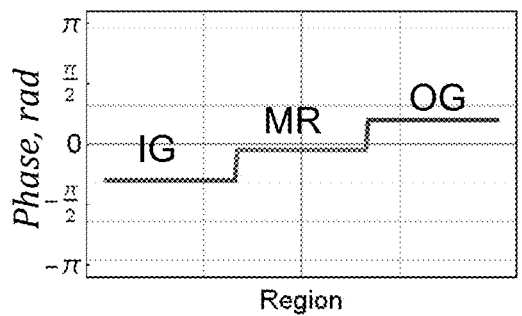
FIG. 13A is a phase map of a waveguide embodiment having a phase matching region comprising an intermediate step.
Figure 13B:
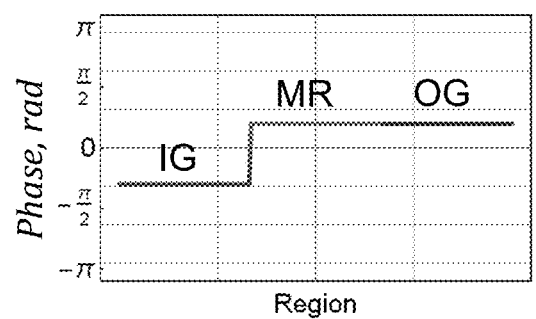
FIG. 13B is a phase map of a waveguide embodiment having a phase matching region matched to the out-coupling grating.
Figure 13C:
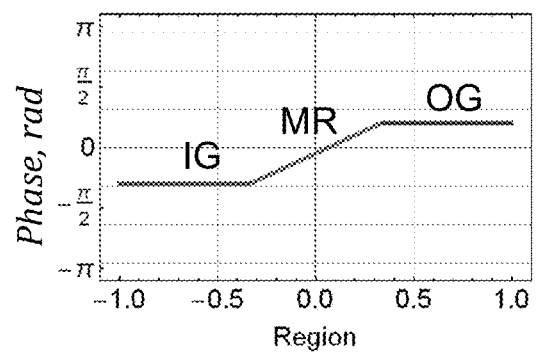
FIG. 13C is a phase map of a waveguide embodiment having a phase matching region comprising a graded step.

Turning to FIGS. 13A to 13C, various phase-matching configurations are considered. The phase-matching region (MR) may have a reflection phase magnitude in between of the reflection phase magnitudes of the in-coupling grating (IG) and the out-coupling grating (OG), as shown in FIG. 13A. The MR may have a reflection phase magnitude equal to the reflection phase magnitudes of the in-coupling grating (IG) or the out-coupling grating (OG), as shown in FIG. 13B. The MR may also have a reflection phase magnitude varying monotonically in between of the reflection phase magnitudes of the in-coupling grating (IG) and the out-coupling grating (OG), as shown in FIG. 13C.

Figure 14A:
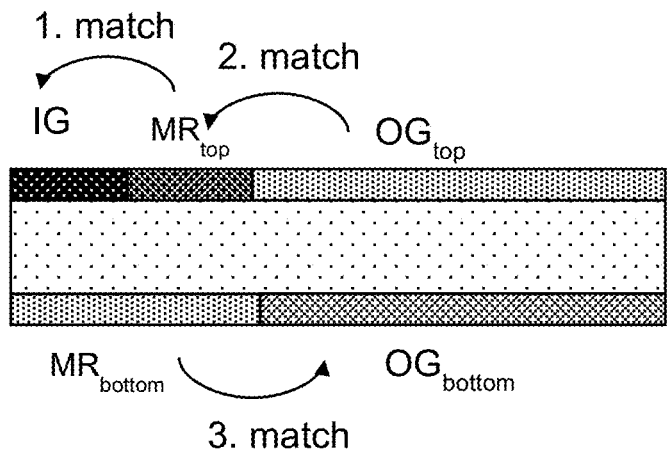
FIGS. 14A and 14B are side cross-sectional views of waveguides of the present disclosure illustrating approaches to phase matching according to the present disclosure.
Figure 14B:
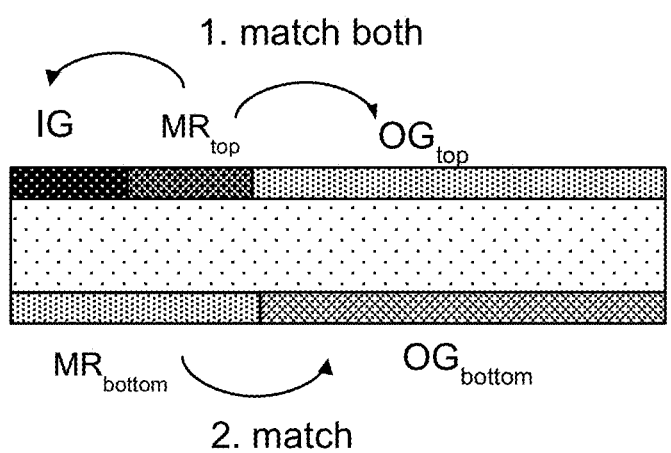

Various approaches to phase matching according to the present disclosure are further considered in FIGS. 14A and 14B. In FIG. 14A, the optical phase of a top phase-matching region $MR_{top}$ is matched as close as possible to an optical phase of an in-coupling grating (IG), and then the optical phase of the top out-coupling grating ($OG_{top}$) is matched to the optical phase of the top phase-matching region $MR_{top}$. The optical phase of a bottom phase-matching region $MR_{bottom}$ is matched to the optical phase of the bottom out-coupling grating ($OG_{bottom}$). In FIG. 14B, the optical phase of a top phase-matching region $MR_{top}$ is either matched to a middle value of the optical phase of the in-coupling grating (IG) and the optical phase of the top out-coupling grating ($OG_{top}$), or alternatively to the optical phase of one of these gratings, and the optical phase of the bottom phase-matching region $MR_{bottom}$ is matched to the optical phase of the bottom out-coupling grating ($OG_{bottom}$). It is noted that there is no requirement to match optical phases of coatings on different sides of the slab.

Figure 15A:
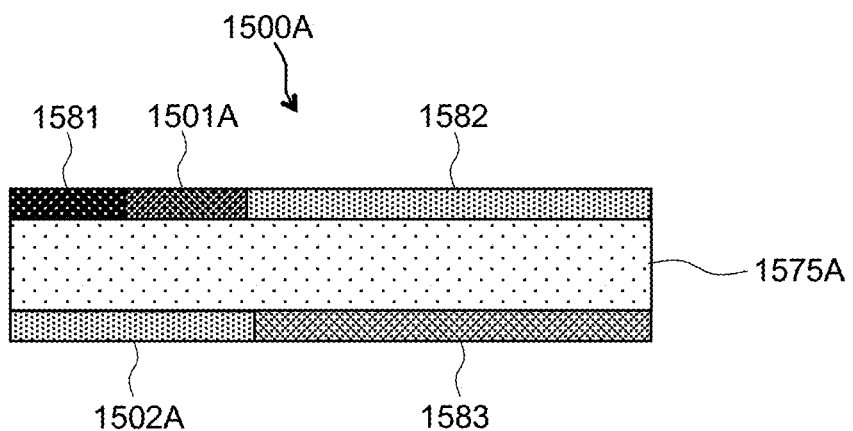
FIG. 15A is a side cross-sectional view of a waveguide of the present disclosure including a phase matching region comprising an intermediate step.
Figure 15B:
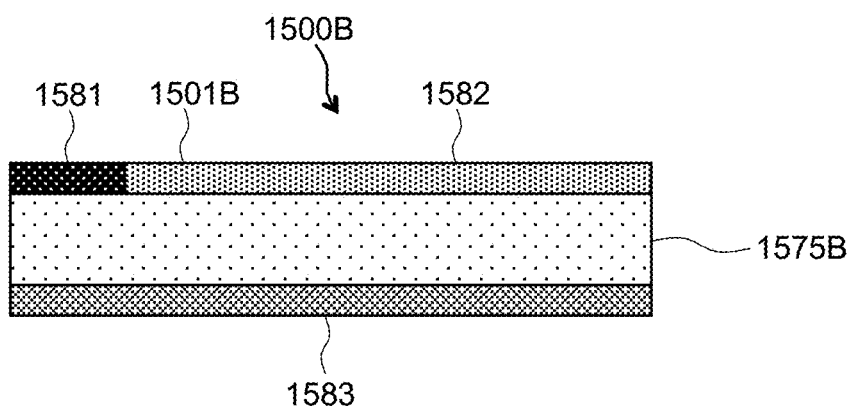
FIG. 15B is a side cross-sectional view of a waveguide of the present disclosure including a phase matching region matched to an out-coupling grating.
Figure 15C:
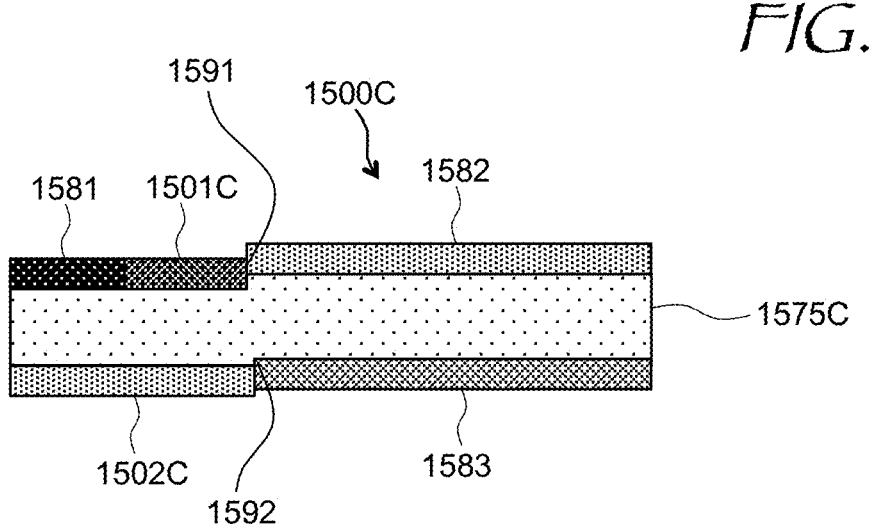
FIG. 15C is a side cross-sectional view of a waveguide of the present disclosure including a void or a step in the waveguide or a coating thereof.

FIGS. 15A to 15C illustrate exemplary embodiments of waveguides of the present disclosure. A waveguide 1500A of FIG. 15A includes first 1581, second 1582, and third 1583 diffraction gratings and first 1501A and second 1502A phase-matching regions supported by a slab 1575A. The first phase-matching region 1501A extends between the first 1581 and second 1582 diffraction gratings on a first (top in FIG. 15A) surface of the slab 1575A, and is conterminous, i.e. shares a common border, with the first 1581 and second 1582 diffraction gratings. The second phase-matching region 1502A is conterminous, i.e. shares a common border, with the third diffraction grating 1583, both being disposed on, and supported by the second surface (the bottom surface in FIG. 15A) of the slab 1575A. The added phases $\phi_1$ of the first diffraction grating 1581, $\phi_2$ of the second diffraction grating 1582, $\phi_3$ of the third diffraction grating 1583, $\phi_{M1}$ of the first phase-matching region 1501A, and $\phi_{M2}$ of the second phase-matching region 1502A satisfy Eqs. (1) and (2) above.

A waveguide 1500B of FIG. 15B includes the first 1581, second 1582, and third 1583 diffraction gratings and a first phase-matching region 1501B supported by a slab 1575B. The first phase-matching region 1501B has the same phase shift as the second diffraction grating 1582 and, in one embodiment, is merely a region of the second diffraction grating 1582. The third diffraction grating 1583 extends across the bottom (second) surface of the slab 1575B.

A waveguide 1500C of FIG. 15C is similar to the waveguide 1500A of FIG. 15A, in that the waveguide 1500C of FIG. 15C includes the first 1581, second 1582, and third 1583 diffraction gratings and a first phase-matching region 1501C supported by a slab 1575C. The slab 1575C has steps 1591 and 1592 in the top and bottom surfaces, respectively, generally of different magnitudes. The magnitudes of the steps 1591 and 1592 are selected so as to lessen respective phase differences. For the top step 1591, the magnitude of the step may be selected to lessen the difference between the phases of the second diffraction grating 1582 and the first phase-matching region 1501C. For the bottom step 1592, the magnitude of the step may be selected to lessen the phase difference between the phases of the second phase-matching region 1502C and the third diffraction grating 1583. The top and bottom steps 1591 and 1592 may be formed by providing an area of reduced thickness of the slab 1575C by polishing, etching, depositing and selective etching of dielectric coatings, etc. For example, the slab 1575C may include a dielectric coating supporting the first 1581 and second 1582 diffraction gratings, and the first phase-matching region 1501C (and, optionally, the first diffraction grating 1581) may be void of the dielectric coating, effectively creating the top step 1591. The bottom step 1592 may be configured similarly.

Referring back to FIG. 1, the optical module 100 may include any of the waveguide structures described herein in place of the waveguide 106. The optical beam 104 may include at least one color channel. For embodiments where the image light comprises a plurality of color channels, the condition $\min(\phi_1, \phi_2) \leq \phi_M \leq \max(\phi_1, \phi_2)$ can be fulfilled for each one of the plurality of color channels.

Figure 16A:
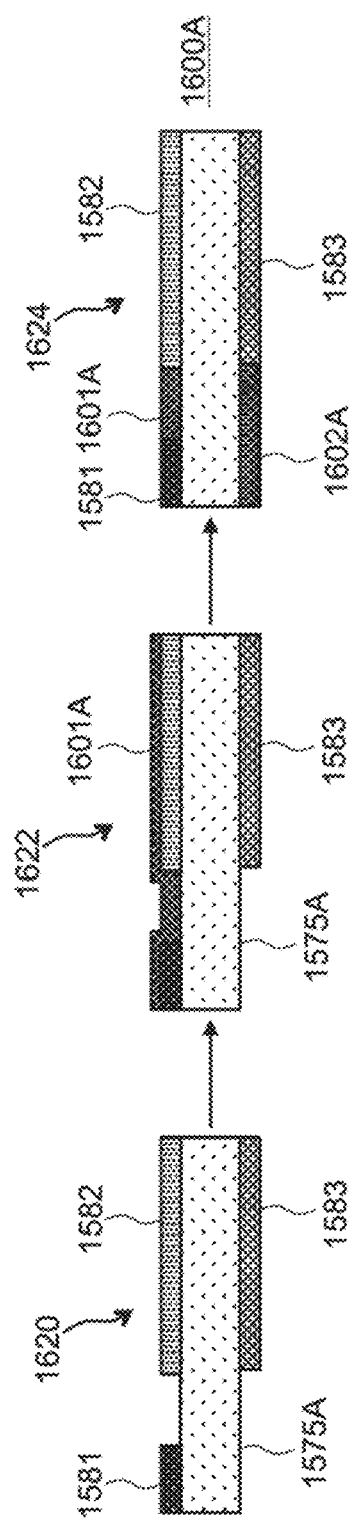
FIG. 16A illustrates side cross-sectional views of a waveguide at different stages of manufacture employing direct photo-patterning of the phase-matching region.

Various non-limiting manufacturing processes for waveguides of the present disclosure will now be described in FIGS. 16A to 16D using a waveguide structure similar to the waveguide 1500A of FIG. 15A as a non-limiting example. FIG. 16A illustrates a manufacturing process of a waveguide 1600A. In this exemplary process, the phase-matching region can be directly photo-patterned. A waveguide die 1620 includes the first 1581, second 1582, and third 1583 diffraction gratings formed on the substrate 1575A using techniques known in the art. A phase-matching region 1601A is deposited, by using a suitable deposition method such as sputtering, spin coating, etc., over the entire upper surface of the waveguide die 1620, as shown at 1622. At 1624, the phase-matching region 1601A is photo-patterned to remove the phase-matching material from the first 1581 and second 1582 diffraction gratings. A similar process may be used for a second phase-matching region 1602A at the bottom side of the slab 1575A, to obtain the waveguide 1600A shown at 1624.

Figure 16B:
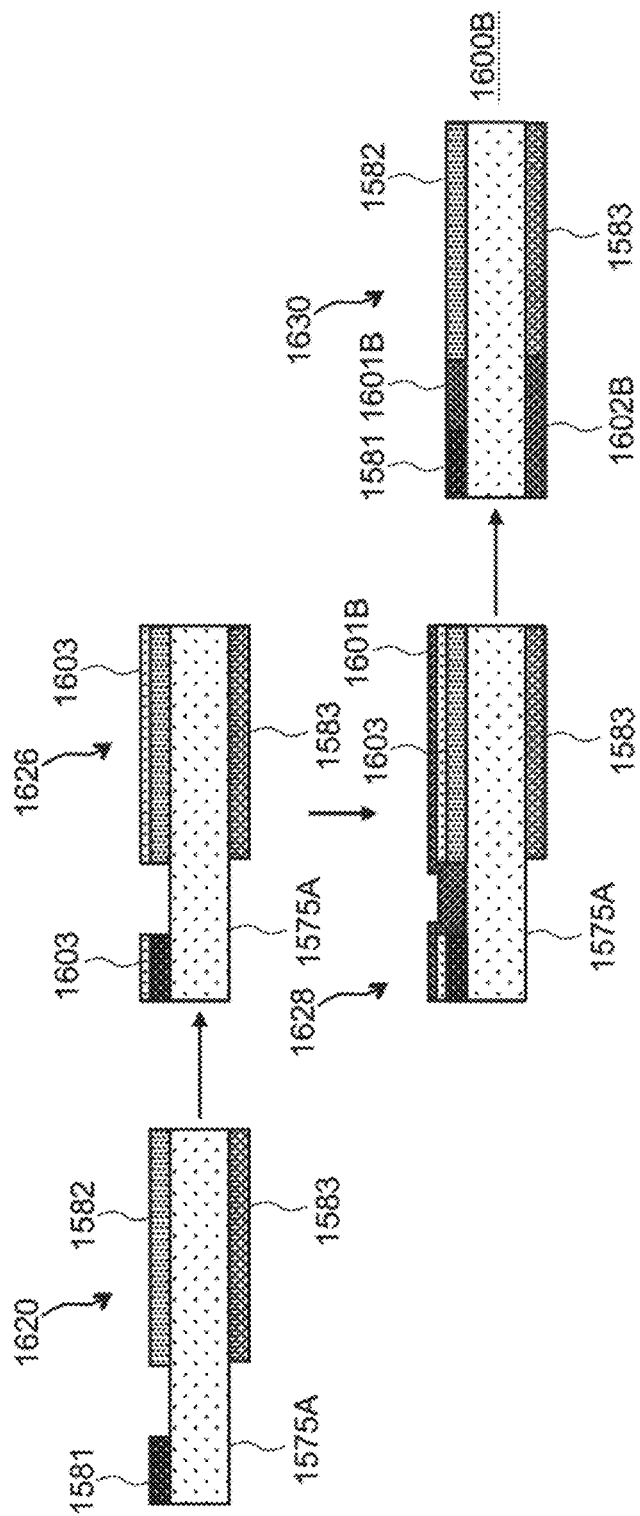
FIG. 16B illustrates side cross-sectional views of a waveguide at different stages of manufacture employing a photoresist lift-off process.

FIG. 16B illustrates a process of manufacturing a waveguide 1600B, in which the phase-matching region cannot be directly photo-patterned. In this case, the waveguide die 1620 is coated with photoresist 1603, which is then photo-patterned to expose a gap between the first 1581 and second 1582 diffraction gratings, as shown at 1626. At 1628, a phase-matching material 1601B is deposited in the gap and over the photoresist 1603. Finally, at 1630, the photoresist 1603 is stripped off, leaving the phase-matching material 1601B in the gap between the first 1581 and second 1582 diffraction gratings. A similar process may be used for a second phase-matching region 1602B at the bottom side of the slab 1575A.

A process of FIG. 16C of manufacturing a waveguide 1600C is similar to the process of FIG. 16B. At 1632 (FIG. 16C), the waveguide die 1620 is first coated with a phase-matching material 1601C and then with the photoresist 1603. At 1634, the photoresist 1603 is photo-patterned to protect the gap between the first 1581 and second 1582 diffraction gratings. Then, at 1636, the phase-matching material 1601C is etched away anywhere but in the gap area, leaving the phase-matching material 1601C in the gap. A similar process may be used for a second phase-matching region 1602C at the bottom side of the slab 1575A.

Figure 16D:
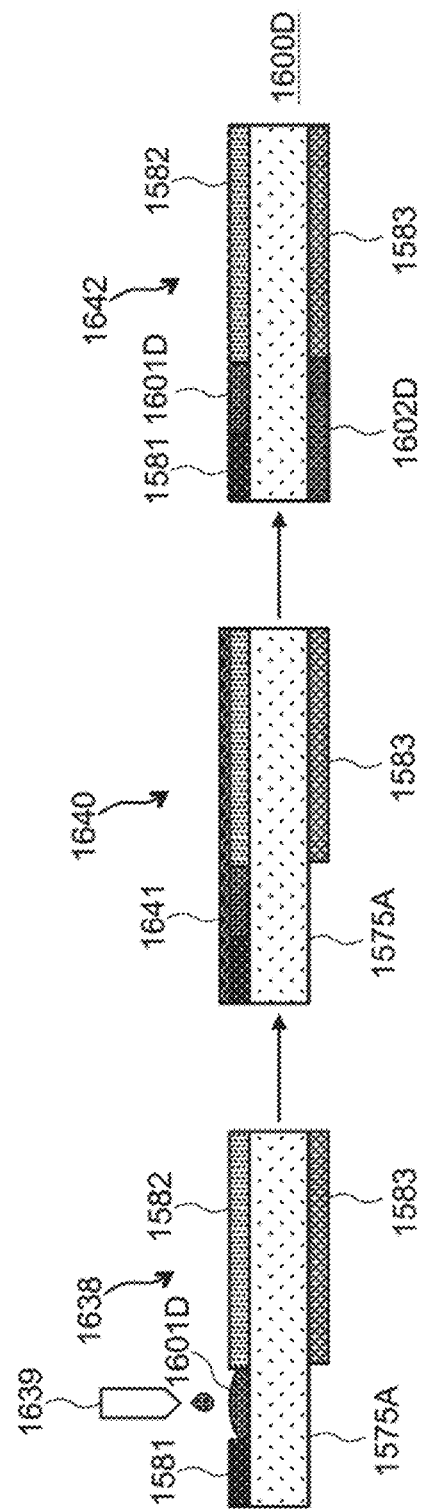
FIG. 16D illustrates side cross-sectional views of a waveguide at different stages of manufacture employing a nano-printing process.

A process of FIG. 16D of manufacturing a waveguide 1600D is based on nano-printing. At 1638, a phase-matching material 1601D, e.g. a polymer in form of a viscous fluid, is deposited by a dispenser 1639 in the gap between the first 1581 and second 1582 diffraction gratings. At 1640, the phase-matching material 1601D is imprinted with a press 1641 to provide a nanopattern having a required reflection phase delay. A similar process may be used for a second phase-matching region 1602D at the bottom side of the slab 1575A. The manufactured waveguide 1600D is shown at 1642. It is noted that the first 1581 and second 1582 diffraction gratings may also be manufactured in step 1640 by nano-printing the grating structures; in this manner, the gradually changing phase delay shown in FIG. 13C may be produced.

Figure 17:
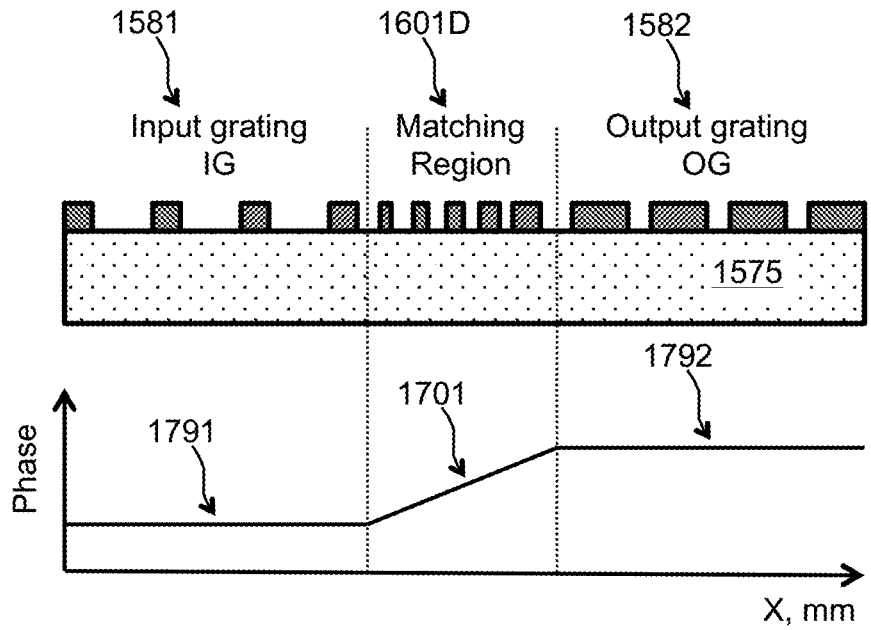
FIG. 17 is a side cross-sectional view and an optical phase map of the waveguide of FIG. 16D.

The latter point is further illustrated in FIG. 17 showing the waveguide 1600D of FIG. 16D in a cross-sectional view. The first diffraction grating 1581, or input grating (IG), has a different pitch and duty cycle than the second diffraction grating 1582, or output grating (OG); and the phase-matching region 1601D may have a duty cycle and height of the grating structure smoothly and gradually varying in going from the first 1581 to the second 1582 diffraction gratings as shown. The pitch of the phase-matching region 1601D may also be varied; the pitch may remain sub-wavelength to avoid diffraction into non-zero diffraction orders. The corresponding reflection phase step changes from a first phase 1791 to a second phase 1792 in gradual transition 1701 corresponding to the phase-matching region 1601D. The first 1581 and second 1582 diffraction gratings and the gradual transition area 1701 may include, by way of example and without limitation, a nanoimprint grating, a metamaterial grating, etc.

Figure 18:
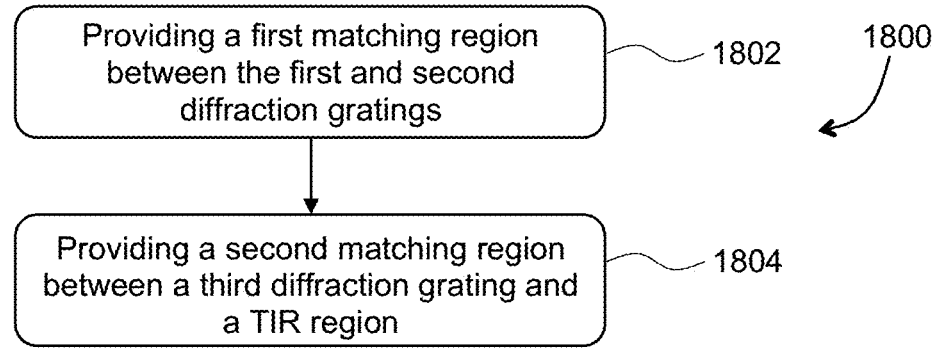
FIG. 18 is a flow chart of a method for improving a modulation transfer function of a waveguide, in accordance with the present disclosure.

Referring now to FIG. 18, a method 1800 for improving a modulation transfer function of a waveguide comprising first and second diffraction gratings includes providing (1802) a first phase-matching region between the first and second diffraction gratings. The first phase-matching region can be e.g. the first phase-matching region 501 of the waveguide 500 of FIG. 5; the phase-matching region 1101 of the waveguide 1100 of FIG. 11; the top phase-matching region $MR_{top}$ of FIGS. 14A and 14B; the first phase-matching regions 1501A, 1501B, and 1501C of FIGS. 15A, 15B, and 15C respectively; the first phase-matching regions 1601A, 1601B, 1601C, and 1601D of FIGS. 16A, 16B, 16C, and 16D respectively, or similar. For an optical beam propagating along the optical path between the first and second diffraction gratings, the first diffraction grating adds a first phase shift $\phi_1$ to the optical beam reflecting therefrom; the second diffraction grating adds a second phase shift $\phi_2$ to the optical beam reflecting therefrom; and the first phase-matching region adds a first matching phase shift $\phi_{M1}$ to the optical beam reflecting therefrom, such that Eq. (1) above is fulfilled.

The first and second diffraction gratings and the first phase-matching region may be supported by a slab of transparent material (e.g. 1575A in FIG. 15A). The slab may support a third diffraction grating (e.g. the third diffraction grating 1583 in FIG. 15A) at a second opposed side of the slab and disposed opposite the second diffraction grating. The path of the optical beam may extend between the first and third diffraction gratings and include the second diffraction grating. For this waveguide embodiment, the method may further include a step of providing (1804) a second phase-matching region conterminous with the third diffraction grating and disposed in the optical path. For the optical beam propagating along the optical path, the third diffraction grating adds a third phase shift $\phi_3$ to the optical beam reflecting therefrom, and the second phase-matching region adds a second matching phase shift $\phi_{M2}$ to the optical beam reflecting therefrom, such that Eq. (2) above is fulfilled.

Figure 19A:
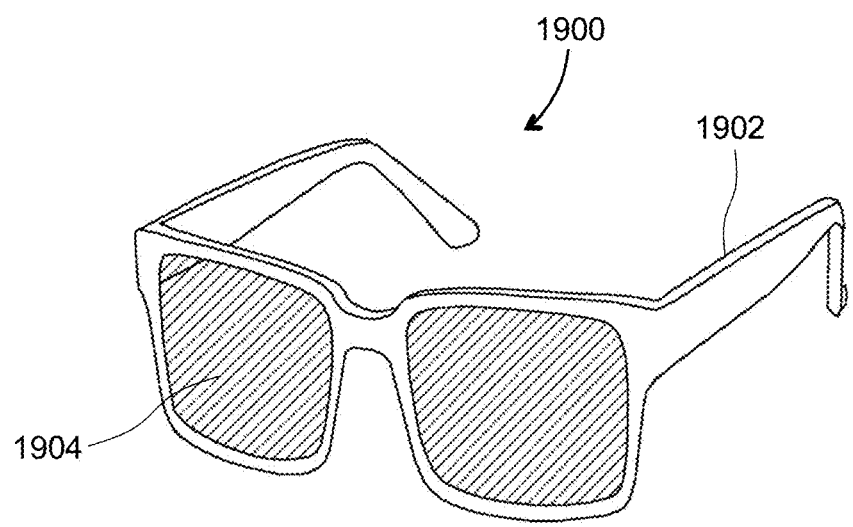
FIG. 19A is an isometric view of an eyeglasses form factor near-eye AR/VR display incorporating a waveguide or an optics block of the present disclosure.
Figure 19B:
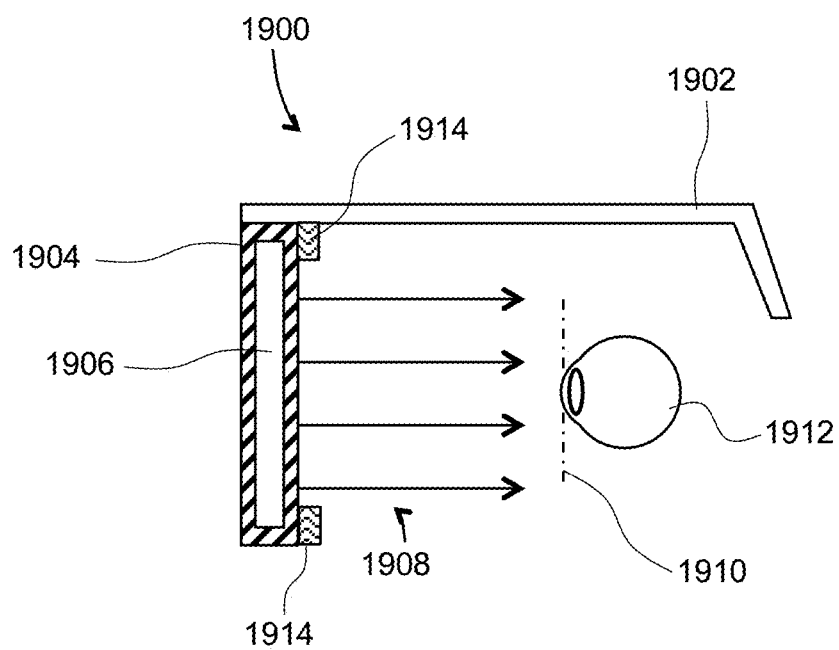
FIG. 19B is a side cross-sectional view of the display of FIG. 19A.

Referring to FIGS. 19A and 19B, a near-eye AR/VR display 1900 can include the waveguide 500 of FIG. 5; the waveguide 1100 of FIG. 11; the waveguides of FIGS. 14A and 14B; the waveguides of FIGS. 15A, 15B, and 15C; the waveguides 1600A, 1600B, 1600C, and 1600D of FIGS. 16A, 16B, 16C, and 16D respectively; or the like. A body or frame 1902 of the near-eye coherent AR/VR display 1900 may have a form factor of a pair of eyeglasses, as illustrated. A display 1904 includes a display assembly 1906 (FIG. 19B) provides image light 1908 to an eyebox 1910, i.e. a geometrical area where a good-quality image may be presented to a user's eye 1912. The display assembly 1906 may include a separate coherent-replication VR/AR display module for each eye, or one coherent-replication VR/AR display module for both eyes.

An electronic display of the display assembly 1906 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye coherent AR/VR display 1400 may also include an eye-tracking system 1914 for determining, in real time, the gaze direction and/or the vergence angle of the user's eyes 1912. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye coherent AR/VR display 1900 may include an audio system, such as small speakers or headphones.

Figure 20:
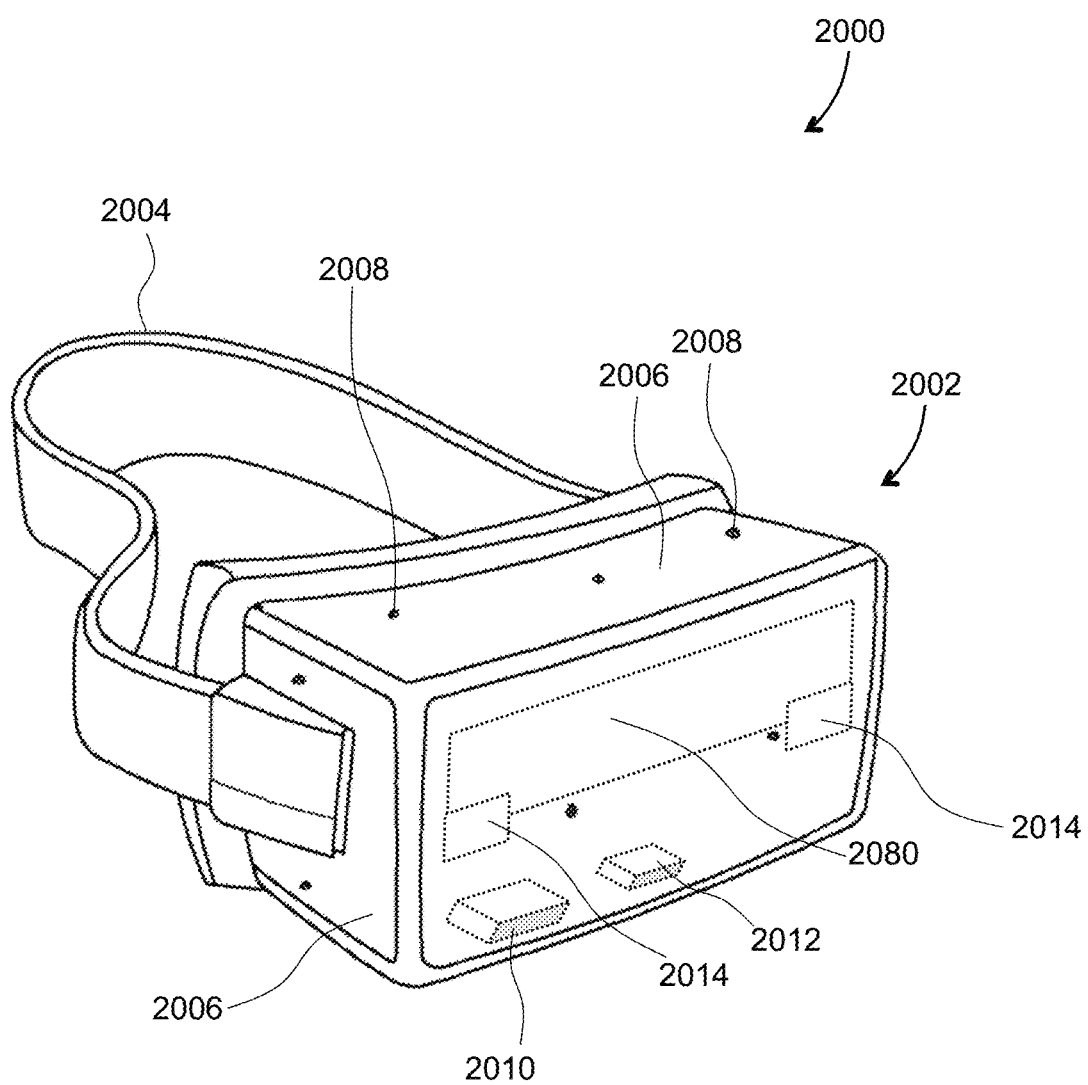
FIG. 20 is an isometric view of a head-mounted display (HMD) incorporating a waveguide or an optics block of the present disclosure.

Turning now to FIG. 20, an HMD 2000 is an example of an AR/VR wearable display system, which encloses the user's face for a greater degree of immersion into the AR/VR environment. The HMD 2000 can present content to a user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 2000 is to augment views of a physical, real-world environment with computer-generated imagery, and/or to generate the entirely virtual 3D imagery. The HMD 2000 may include a front body 2002 and a band 2004. The front body 2002 is configured for placement in front of eyes of a user in a reliable and comfortable manner, and the band 2004 may be stretched to secure the front body 2002 on the user's head. A display system 2080 may include any of the waveguides described above. The display system 2080 may be disposed in the front body 2002 for presenting AR/VR imagery to the user. Sides 2006 of the front body 2002 may be opaque or transparent.

In some embodiments, the front body 2002 includes locators 2008, an inertial measurement unit (IMU) 2010 for tracking acceleration of the HMD 2000, and position sensors 2012 for tracking position of the HMD 2000. The locators 2008 are traced by an external imaging device of a virtual reality system, such that the virtual reality system can track the location and orientation of the entire HMD 2000. Information generated by the IMU and the position sensors 2012 may be compared with the position and orientation obtained by tracking the locators 2008, for improved tracking of position and orientation of the HMD 2000. Accurate position and orientation are important for presenting appropriate virtual scenery to the user as the latter moves and turns in 3D space.

The HMD 2000 may further include an eye tracking system 2014, which determines orientation and position of user's eyes in real time. The obtained position and orientation of the eyes allows the HMD 2000 to determine the gaze direction of the user and to adjust the image generated by the display system 2080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2002.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide comprising:
a slab of transparent material having first and second opposed sides;
first and second diffraction gratings supported by the slab at the first side thereof;
a third diffraction grating supported by the slab at the second side thereof and disposed opposite the second diffraction grating; and
a first phase-matching region conterminous with the first and second diffraction gratings and disposed in an optical path extending between the first and third diffraction gratings and including the second diffraction grating, wherein, for an optical beam propagating along the optical path:
the first diffraction grating adds a first phase shift $\phi_1$ to the optical beam reflecting therefrom;
the second diffraction grating adds a second phase shift $\phi_2$ to the optical beam reflecting therefrom; and
the first phase-matching region adds a first matching phase shift $\phi_{M1}$ to the optical beam reflecting therefrom, such that $$\min(\phi_1,\phi_2) \le \phi_{M1} \le \max(\phi_1,\phi_2).$$

2. The waveguide of claim 1, wherein the first phase-matching region is distinct from the first and second diffraction gratings.

3. The waveguide of claim 2, wherein the first phase-matching region comprises a dielectric coating.

4. The waveguide of claim 2, wherein the first phase-matching region comprises a polymer layer.

5. The waveguide of claim 2, wherein the first phase-matching region comprises a metamaterial.

6. The waveguide of claim 2, wherein the first phase-matching region comprises a subwavelength grating.

7. The waveguide of claim 2, wherein $|\phi_1-\phi_2| \le 0.6\pi$.

8. The waveguide of claim 2, wherein the first matching phase shift $\phi_{M1}$ monotonically varies from $\phi_1$ to $\phi_2$ in going from the first diffraction grating to the second diffraction grating.

9. The waveguide of claim 8, wherein the first phase-matching region comprises a subwavelength grating with monotonically varying grating period in going from the first diffraction grating to the second diffraction grating.

10. The waveguide of claim 1, wherein the first phase-matching region comprises one of the first and second diffraction gratings, whereby the first and second diffraction gratings are conterminous.

11. The waveguide of claim 1, wherein the slab comprises the optical path and supports the first phase-matching region at the first side of the slab.

12. The waveguide of claim 1, wherein the first phase-matching region comprises an area of a reduced thickness of the slab.

13. The waveguide of claim 1, wherein the slab comprises a dielectric coating supporting the first and second diffraction gratings, wherein the first phase-matching region is void of the dielectric coating.

14. The waveguide of claim 1, further comprising a second phase-matching region conterminous with the third diffraction grating and disposed in the optical path, wherein, for the optical beam propagating along the optical path:
the third diffraction grating adds a third phase shift $\phi_3$ to the optical beam reflecting therefrom; and
the second phase-matching region adds a second matching phase shift $\phi_{M2}$ to the optical beam reflecting therefrom, such that $$|\phi_3-\phi_{M2}| < |\phi_3-\phi_{TIR}|,$$

wherein $\phi_{TIR}$ is a phase shift added to the optical beam upon total internal reflection (TIR) of the optical beam from inside the slab.

15. An optical module comprising the waveguide of claim 1 and an image projector optically coupled thereto for providing the optical beam, wherein the optical beam comprises a first color channel.

16. The optical module of claim 15, wherein the image light comprises a plurality of color channels including the first color channel, wherein the condition $\min(\phi_1,\phi_2) \le \phi_M \le \max(\phi_1,\phi_2)$ is fulfilled for each one of the plurality of color channels.

17. The optical module of claim 15, wherein the first phase-matching region is distinct from the first and second diffraction gratings.

18. The waveguide of claim 17, wherein the first phase-matching region comprises a dielectric coating.

19. The optical module of claim 15, wherein $|\phi_1-\phi_2| \le 0.6\pi$.

20. The optical module of claim 15, wherein the slab comprises the optical path and supports the first phase-matching region at the first side of the slab.

21. The optical module of claim 15, wherein the first phase-matching region comprises an area of a reduced thickness of the slab.

22. The optical module of claim 15, wherein the slab comprises a dielectric coating supporting the first and second diffraction gratings, wherein the first phase-matching region is void of the dielectric coating.

23. The optical module of claim 15, wherein the waveguide further comprises a second phase-matching region conterminous with the third diffraction grating and disposed in the optical path, wherein, for the optical beam propagating along the optical path:
the third diffraction grating adds a third phase shift $\phi_3$ to the optical beam reflecting therefrom; and
the second phase-matching region adds a second matching phase shift $\phi_{M2}$ to the optical beam reflecting therefrom, such that $$|\phi_3-\phi_{M2}| < |\phi_3-\phi_{TIR}|,$$

wherein $\phi_{TIR}$ is a phase shift added to the optical beam upon total internal reflection (TIR) of the optical beam from inside the slab.

24. A method for improving a modulation transfer function of a waveguide comprising a slab of transparent material having first and second opposed sides and supporting first and second diffraction gratings at the first side and a third diffraction grating at the second side opposite the second diffraction grating, the method comprising:

providing a first phase-matching region between the first and second diffraction gratings, wherein, for an optical beam propagating along an optical path extending between the first and third diffraction gratings and including the second diffraction grating:

the first diffraction grating adds a first phase shift $\phi_1$ to the optical beam reflecting therefrom;

the second diffraction grating adds a second phase shift $\phi_2$ to the optical beam reflecting therefrom; and the first phase-matching region adds a first matching phase shift $\phi_{M1}$ to the optical beam reflecting therefrom, such that $$\min(\phi_1,\phi_2) \leq \phi_{M1} \leq \max(\phi_1,\phi_2).$$

25. The method of claim 24, further comprising:
providing a second phase-matching region conterminous with the third diffraction grating and disposed in the optical path, wherein, for the optical beam propagating along the optical path:

the third diffraction grating adds a third phase shift $\phi_3$ to the optical beam reflecting therefrom; and the second phase-matching region adds a second matching phase shift $\phi_{M2}$ to the optical beam reflecting therefrom, such that $$|\phi_3 - \phi_{M2}| < |\phi_3 - \phi_{TIR}|,$$

wherein $\phi_{TIR}$ is a phase shift added to the optical beam upon total internal reflection (TIR) of the optical beam from inside the slab.

26. The method of claim 24, wherein $|\phi_1 - \phi_2| \leq 0.6\pi$.

* * * * *